March 16, 1926.

S. CRAYFORD 1,576,952

MOWING MACHINE ATTACHMENT

Filed March 3, 1922

Inventor
S. Crayford
By Attorney

Patented Mar. 16, 1926.

1,576,952

UNITED STATES PATENT OFFICE.

SIDNEY CRAYFORD, OF COWLEY, ALBERTA, CANADA.

MOWING-MACHINE ATTACHMENT.

Application filed March 3, 1922. Serial No. 540,834.

*To all whom it may concern:*

Be it known that I, SIDNEY CRAYFORD, a citizen of Canada, and a resident of Cowley, in the county of Macleod, Province of Alberta, Canada, have invented certain new and useful Improvements in Mowing-Machine Attachments, of which the following is a specification.

This invention relates to agricultural machinery, having reference particularly to an attachment for mowing machines.

The invention has for an object the provision of an improved apparatus of this character which is readily adaptable for attachment to standard mowing machines and which comprises means for automatically throwing the cut grain back of the cutter-bar coincidentally with the cutting operation.

A further object being to provide means for turning the grain towards the knives when the mower is travelling with the wind, when it is blowing strongly.

In carrying out my invention, I provide a reel adapted to rotate in the direction of rotation of the traction wheels of a mowing machine, means for transmitting power from one of the traction wheels of the mower to said reel, means for vertically adjusting the reel to various heights, and means for mounting the attachment on the cutting-bar of the mower, all as hereinafter fully described and specifically set forth in the appended claims.

In the accompanying drawings forming part of this specification, Figure 1 is a side view showing my improved device attached to a mowing machine.

Figure 1:
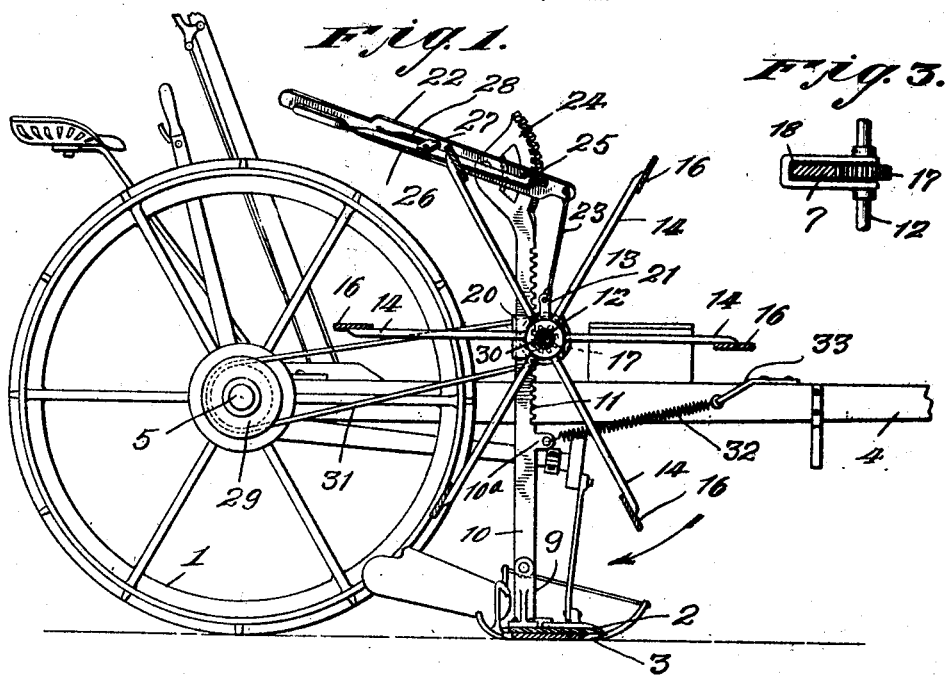
Figure 3:
Fig. 3 is a fragmentary cross section taken on the line 3—3 of Fig. 2.
Figure 2:
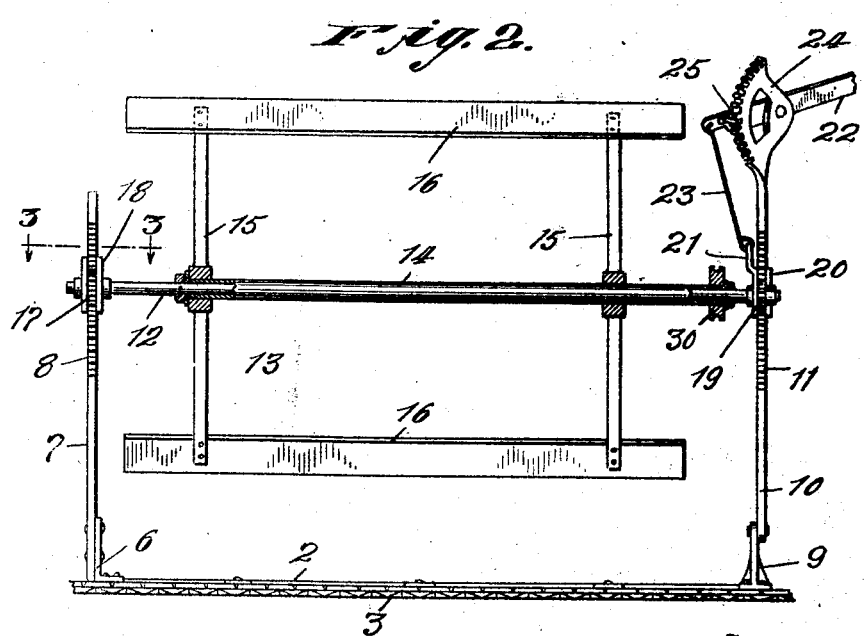
Fig. 2 is a front view of my improved device.

In the drawings I have illustrated a part only of a mowing machine, which it is not necessary to describe or illustrate in detail, as the mower does not form part of the present invention. In said mower, 1 indicates one of the traction wheels, 2 the cutter bar, 3 the reciprocative knives, 4 the tongue to which horses are adapted to be harnessed, and 5 the axle.

Mounted on the outer end of the cutter-mechanism 2, by means of a bracket 6, is a fixed standard 7 having a rack 8 on the face thereof; and a relatively short standard 9 is mounted on the inner end of said cutter-bar, said last named standard having a rod 10 pivoted to the upper end thereof which is provided with a rack 11 having teeth which register on a line with the teeth of the standard 7.

Extended between the standard 7 and the rod 10, is a shaft 12, having a reel 13 mounted thereon which comprises a rotative sleeve 14, oppositely located radial arms 15 and cross paddles 16, said reel being loosely mounted on said shaft 12, whereby it may be rotated independently of said shaft.

Fixed to one end of the shaft 12 is a toothed pinion 17, which engages the rack 8 and is held in connection therewith by means of a bifurcated slide 18, which embraces the standard 7 and supports the pinion 17 between its two arms, the shaft 12 being journaled through said arms.

The other end of the shaft 12 has a pinion 19 mounted thereon which is of the same diameter as the pinion 17, the shaft end which supports said pinion being journaled through the arms of a bifurcated slide 20, which embraces the rod 10.

The slide 20 has an upwardly extended arm 21, which is connected with the free end of a lever 22 by means of a connecting-rod 23, said lever being pivotally mounted on a toothed sector 24, which forms part of the rod 11. This lever is adapted for adjusting the shaft 12 upwardly and downwardly for the purpose of raising or lowering the reel 13, and said lever is adapted to be locked in arbitrarily set position relative to the sector 24 by means of a laterally swinging bolt 25 extended from the free end of a spring-pressed lever 26, which is pivoted on a stud 27 of the lever 22, said bolt 25 being normally maintained in connection with the teeth of the sector 24, by means of a spring 28.

As a means for rotating the reel 13, a pulley 29 is fixed to the axle 5 of the mower, and a smaller pulley 30 is fixed to the sleeve 14 of the reel, said pulleys being connected by means of a flexible belt 31, whereby rotation of the traction wheel 1 in a forward direction transmits rotary movement to the pulley 30, at an increased speed, for the purpose of rapidly rotating the reel 13.

The belt 31 is maintained taut by means of a spring 32, which is connected at one end to an extension 10ᵃ of the rod 10, and at the other end to an arm 33 fixed to the tongue 4 of the mower.

It is manifest that the vertically adjustable means for raising and lowering the reel comprises an efficient means for placing said reel in proper juxtaposition for operating on grain of various heights, thus permitting of the cutting of very short grain; and the flexible means for mounting the supporting rod 10 admits of operating the device over rough and uneven ground.

In the operation of the device the reel may be raised and lowered by an operator located on the mower, by manipulating the lever 22, while the mower is moving forwardly, the paddles 16 tending to force the grain against the cutting knives and coincidentally feed the cut grain rearwardly, from whence it may be disposed of in any customary and adaptable manner.

While I have illustrated a fair example of my improvement I do not wish to be understood as confining myself to the specific details of mere mechanical construction as shown, as under the spirit of my invention I believe that I am entitled to the employment of such minor variations as may fall within the scope of the appended claims.

Having thus described my invention, what I claim as new and desire to secure by Letters Patent, is:

1. In a mowing machine in combination, cutter mechanism, an upright standard carrying a rack supported by the cutter mechanism, a pivotally jointed upright standard carrying a corresponding rack carried by the cutter mechanism and spaced from the first standard, a shaft extending between the two standards and having a tooth pinion at each end thereof meshing with the racks, a loose sleeve revoluble upon the shaft and carrying a plurality of arms parallel to the cutting mechanism, revolving means connecting the sleeve with an axle of the machine, means whereby the jointed standard may be moved upon its pivot maintaining revoluble movement between the shaft and the axle and means whereby the sleeve arms may be moved vertically while the machine is in motion.

2. In a mowing machine in combination, cutter mechanism, an upright standard carrying a rack supported by the cutter mechanism, a pivotally jointed upright standard carrying a corresponding rack carried by the cutter mechanism and spaced from the first standard, a shaft extending between the two standards and having a tooth pinion at each end thereof meshing with the racks, a loose sleeve revoluble upon the shaft and carrying a plurality of arms parallel to the cutting mechanism, a pulley fixedly attached to the sleeve, a pulley fixedly attached to the axle of the machine, a belt carried by the two pulleys, spring means whereby the jointed upright will be moved upon its pivot to maintain frictional contact between the belt and the pulleys and means whereby the sleeve arms may be moved vertically while the machine is in motion.

Signed at Cowley, Alba., in the county of Macleod and Prov. of Alberta, Can., this 24 day of Nov., A. D. 1921.

SIDNEY CRAYFORD.